Figure 1:
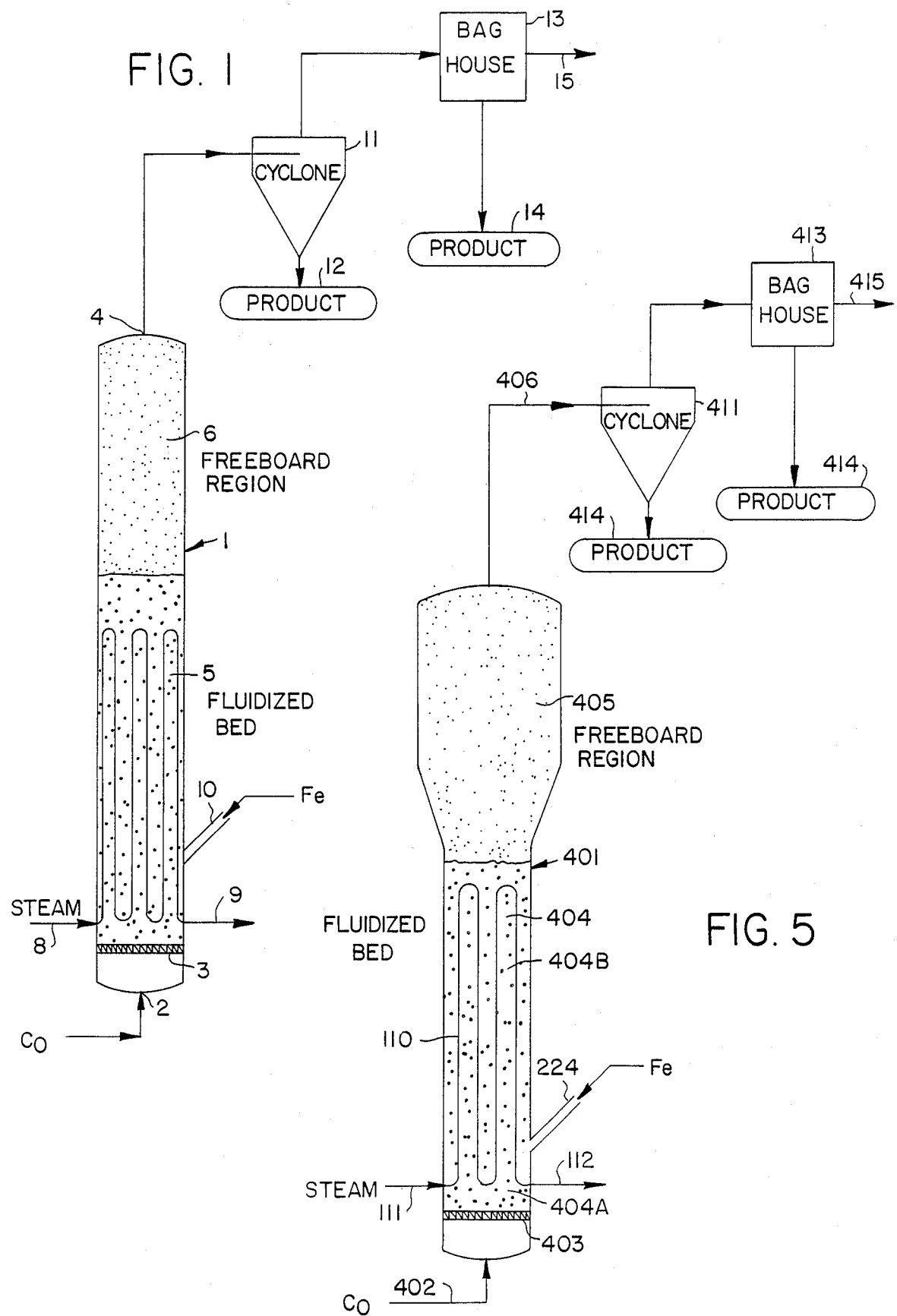

United States Patent [19]

Brooks

[11] Patent Number: 4,767,737

[45] Date of Patent: * Aug. 30, 1988

[54] METHOD FOR MAKING CARBONACEOUS MATERIALS

[75] Inventor: Edward F. Brooks, Hermosa Beach, Calif.

[73] Assignee: TRW Inc., Redondo Beach, Calif.

[*] Notice: The portion of the term of this patent subsequent to Mar. 17, 2004 has been disclaimed.

[21] Appl. No.: 887,724

[22] Filed: Jul. 21, 1986

Related U.S. Application Data

[63] Continuation of Ser. No. 620,996, Jun. 15, 1984, Pat. No. 4,650,657, which is a continuation-in-part of Ser. No. 339,778, Jan. 15, 1982, abandoned, which is a continuation of Ser. No. 188,201, Sep. 18, 1980, abandoned.

[51] Int. Cl.$^4$ .................. B01J 21/18; B01J 20/20; C01B 31/02; C10K 3/04
[52] U.S. Cl. .................. 502/185; 48/197 R; 423/447.3; 423/459; 502/438
[58] Field of Search .................. 423/459, 461, 447.3, 423/DIG. 15, DIG. 16; 502/438, 177, 182, 185, 416, 423, 21, 438, 518; 48/197 R, 203

[56] References Cited

U.S. PATENT DOCUMENTS

| | | | |
|---|---|---|---|
| 1,964,744 | 7/1934 | Odell | 423/459 |
| 2,008,270 | 7/1935 | Willekens | 423/459 |
| 2,704,293 | 3/1955 | Kratzer | 260/450 |
| 3,816,609 | 6/1964 | Hammer | 502/185 X |
| 3,861,885 | 1/1975 | Schora | 423/459 |
| 4,242,103 | 12/1980 | Rabo et al. | 48/197 R |
| 4,242,104 | 12/1980 | Frost et al. | 502/438 |
| 4,583,299 | 4/1986 | Brooks | 502/182 |
| 4,591,334 | 5/1986 | Brooks | 502/182 |
| 4,642,125 | 2/1987 | Burk et al. | 48/197 R |
| 4,650,657 | 3/1987 | Brooks | 502/185 |

FOREIGN PATENT DOCUMENTS

865490 4/1961 United Kingdom .................. 502/20

*Primary Examiner*—Paul E. Konopka
*Attorney, Agent, or Firm*—Shlomo R. Frieman; Benjamin DeWitt

[57] ABSTRACT

A fluidized bed disproportionation of carbon monoxide is effected using ferrous metal component-containing catalysts in particulate form. The bed also contains an abradant to continuously remove from the surface of those particles a substantial quantity of the carbonaceous fibers formed on those surfaces. The method produces a carbonaceous material of desired carbon and ferrous metal content. The process allows the use of two beds in series for producing high carbon content products.

34 Claims, 5 Drawing Sheets

METHOD FOR MAKING CARBONACEOUS MATERIALS

CROSS-REFERENCES

This application is a continuation of application Ser. No. 620,996 filed June 15, 1984, now U.S. Pat. No. 4,650,657, which is a continuation-in-part of application Ser. No. 339,778 filed on Jan. 15, 1982, now abandoned, which is incorporated herein by this reference, which is a continuation of application Ser. No. 188,201 filed Sept. 18, 1980, now abandoned.

BACKGROUND OF THE INVENTION

This invention relates to a method for making carbonaceous materials that contain one or more ferrous metal components. More particularly, the invention relates to a fluidized bed method for disproportionating carbon monoxide using a particulate ferrous group metal component catalyst in a fluidized bed that contains a sufficient amount of inert abradant to remove a substantial amount of the carbon formed on the surface of the particulate catalyst.

U.S. patent application Ser. No. 99,789 filed Dec. 3, 1979, discloses a new family of carbon/metal materials and methods for making them. The entire disclosure of that application is hereby incorporated in this application by reference. Briefly, that application discloses making carbon/metal materials by disproportionating carbon monoxide in the presence of a ferrous group metal component catalyst which may be a metal, an alloy, a carbide or other metallic substance. As explained there, disproportionation means any of the reactions which occur in the presence of a ferrous group metal to produce carbon from carbon monoxide, which can be part of a mixture containing hydrogen or other substances. The following are typical reactions:

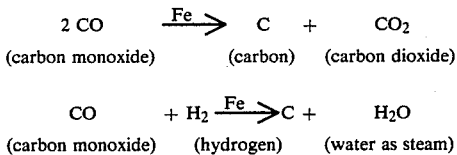

In these processes, carbonaceous material forms on and grows from the catalyst surface primarily in the form of fibers. Some non-fibrous carbon can also be present. As disproportionation continues, these fibers become tangled masses that occupy increasingly larger volumes in the fluidized bed reactor. Simultaneously, the effective density of the carbonaceous material produced falls toward the range of about 0.05 to about 0.7 grams per cubic centimeter.

It is difficult to produce fibrous carbon/metal materials of preselected properties in a continuous process. For example, as substantial amounts of carbon deposit on catalyst particles larger than 120 microns, the bed tends to form two substantially distinct parts. The lower part of the bed includes relatively large, partially carburized ferrous group metal component particles. The upper part of the bed includes smaller carbon and ferrous metal component particles that have broken away from the larger particles in the lower part of the bed. If the bed contains only carbon and ferrous metal component catalyst, the bed mass generally becomes larger than desired, and the ratio of ferrous metal to carbon in the elutriated product is not easily controlled. Further, if the superficial gas velocity is too low, the bed mass can increase until the entire reactor is filled with carbon/metal material, which is undesirable, and can also result in too broad a range of carbon to metal ratio in the product, too high a carbon to metal ratio in the product, and too high bulk density of the product. If the superficial gas velocity is too high, then material can be entrained from the reactor with a lower than desired carbon to metal ratio.

Other problems can arise as a result of overall or local temperature fluctuations in the bed. As the bed temperature is increased, the ratio of nonfibrous to fibrous carbon in the carbon/metal product can become larger than desired. Control of temperature is difficult because the carbon deposition process is exothermic, so that in a practical commercial system it is necessary to have heat exchange tubes immersed in the fluid bed to provide heat removal to maintain a desired bed temperature. Low density carbon/metal material can cling to heat transfer surfaces, resulting in an insulating layer being formed on the heat transfer surfaces which prevents adequate heat removal and results in an undesirable rise in the bed temperature.

Thus, there is a need for a continuous process for efficiently preparing fibrous carbon/metal materials of preselected properties.

SUMMARY

The present invention satisfies this need. In general, the method of the present invention provides for fluidized bed disproportionation of carbon monoxide using ferrous metal component-containing catalysts in particulate form together with a sufficient amount of at least one abradant to continuously remove from the surface of those particles a substantial quantity of the carbonaceous fibers formed on those surfaces. This method produces a carbonaceous material of a desired carbon content and bulk density.

In the process of the present invention, a feed gas containing carbon monoxide is introduced into a reaction zone having a bed containing particulate material to form a fluidized bed. The particulate material comprises an abradant and a ferrous metal containing catalyst. The catalyst catalyzes the disproportionation of at least a portion of the carbon monoxide of the feed gas to form (i) a reacted gas stream and (ii) a fibrous carbonaceous/ferrous metal material that forms on the surface of the catalyst. The abradant abrades the fibrous carbonaceous/ferrous metal material from the surface of the catalyst. The abradant also inhibits carbon/metal material from clinging to heat transfer surfaces and the reactor walls. The feed gas is introduced into the reaction zone at a sufficient velocity for fluidizing the particulate material and so that the reacted gas elutriates from the fluidized bed abraded fibrous carbonaceous/ferrous metal material. The temperature of the reaction zone is maintained from 300° to 700° C. and the pressure in the reaction zone is maintained from 1 to about 10 atmospheres. Preferably the feed gas is introduced to the reaction zone at a temperature at least 50° C. less than the reaction zone temperature, and generally at about 250° C. or less. This reduces the heat load on the heat transfer system and avoids carbon deposition at the feed gas inlet.

The elutriated fibrous carbonaceous/ferrous metal material is withdrawn from the reaction zone. The withdrawn material comprises at least 2% by weight ferrous metal and has a weight average particle size of from about 1 to about 50 microns.

Ferrous metal is introduced to the reaction zone for replenishing the ferrous metal withdrawn from the reaction zone as part of the fibrous carbonaceous/ferrous metal material.

In one version of the invention, where a high carbon content product is desired, the elutriated material from a first fluidized bed can be introduced into a second fluidized bed for increasing the carbon to ferrous metal ratio in the product. If desired, the elutriated product from the first bed can be fragmented before it is introduced into the second bed for decreasing the bulk density of the carbon/ferrous metal material prior to carbon deposition in the second bed.

As described in detail below, the fibrous materials produced according to this fluidized bed process have unique properties, at least partially resulting from the ferrous metal content of the material.

This method provides significant advantages in the fluidized bed disproportionation of carbon monoxide. This carbonaceous product can have a high ratio, 4:1 or even higher, of carbon-to-ferrous metal component. Because the abradant acts first to remove from the catalyst surface the carbon farthest from that surface, the ratio of carbon to ferrous metal component in the elutriated carbanaceous product tends to be substantially higher than where no abradant is used. Further, by promoting fragmentation of elutriable particles, the abradant controls the size of the reactant mass in the bed. In the continuous operation of the process, the size of the reactant mass can be minimized, thus minimizing both the reactor volume needed and the pressure drop across the reactor. The abradant also removes carbonaceous material from reactor surfaces, keeping those surfaces clean. This is most important at places such as distributor plate orifices, which tend to clog, and heat transfer surfaces.

DRAWINGS

Figure 2:
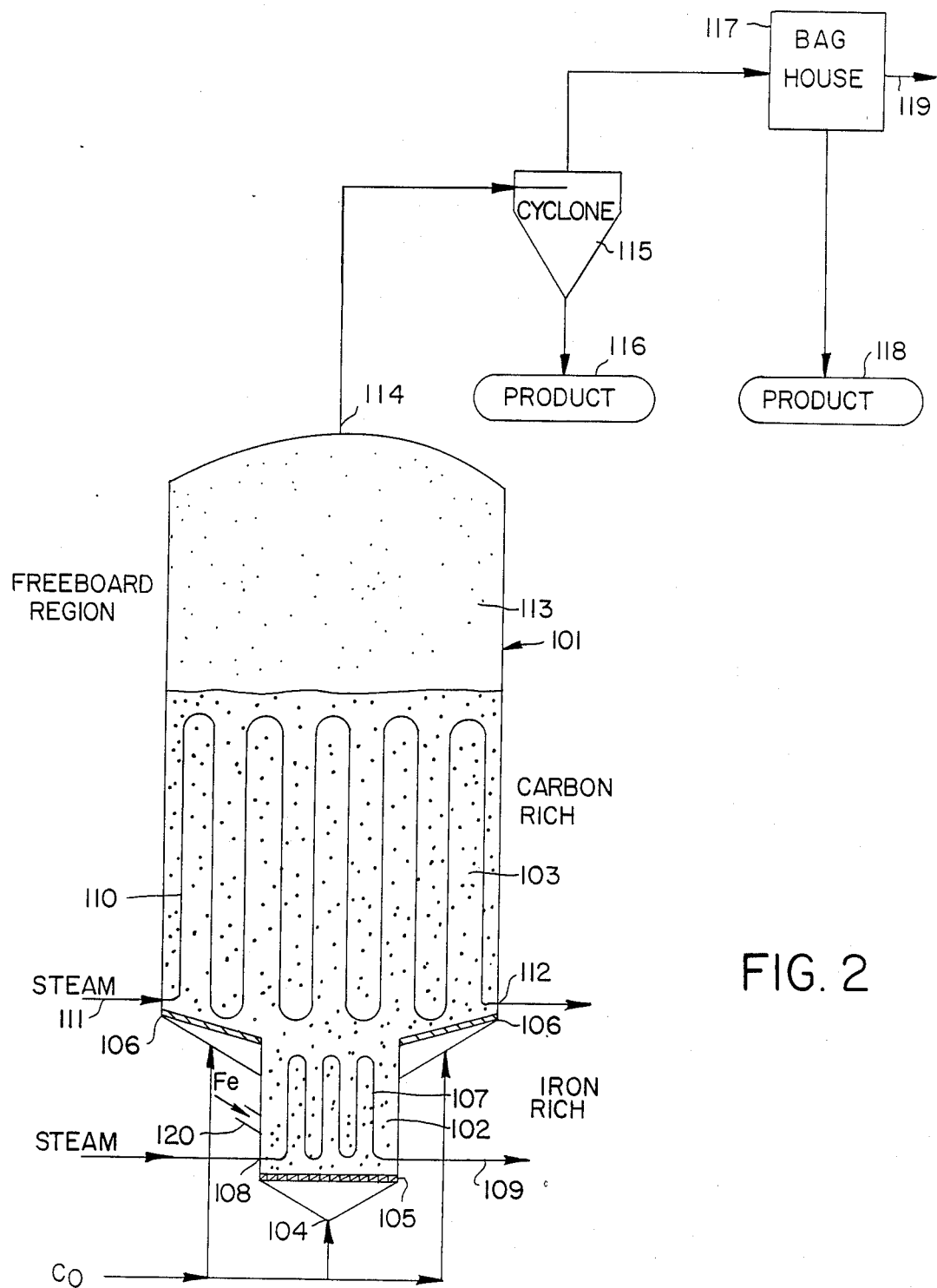
Figure 3:
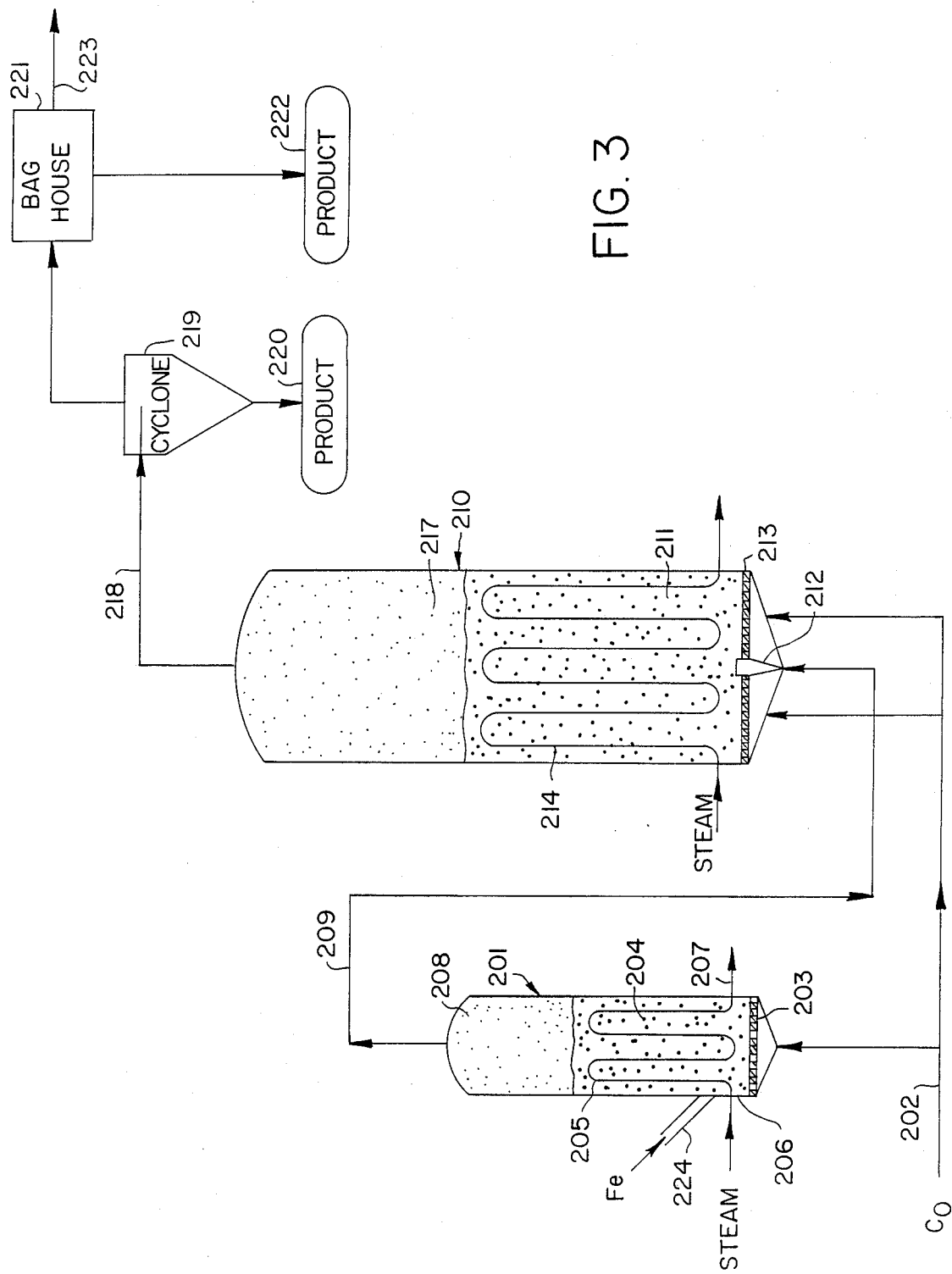
Figure 4:
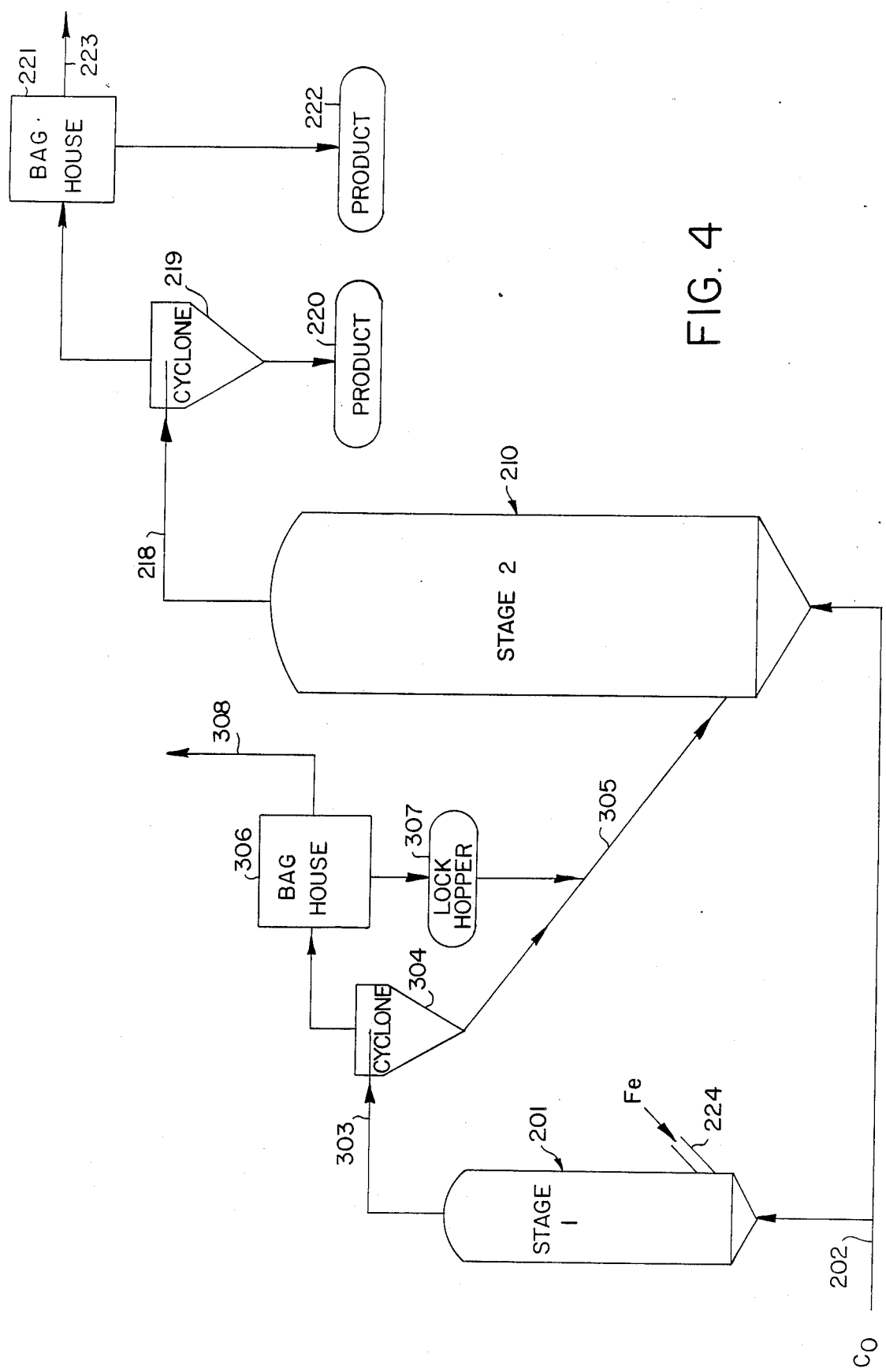
Figure 6:
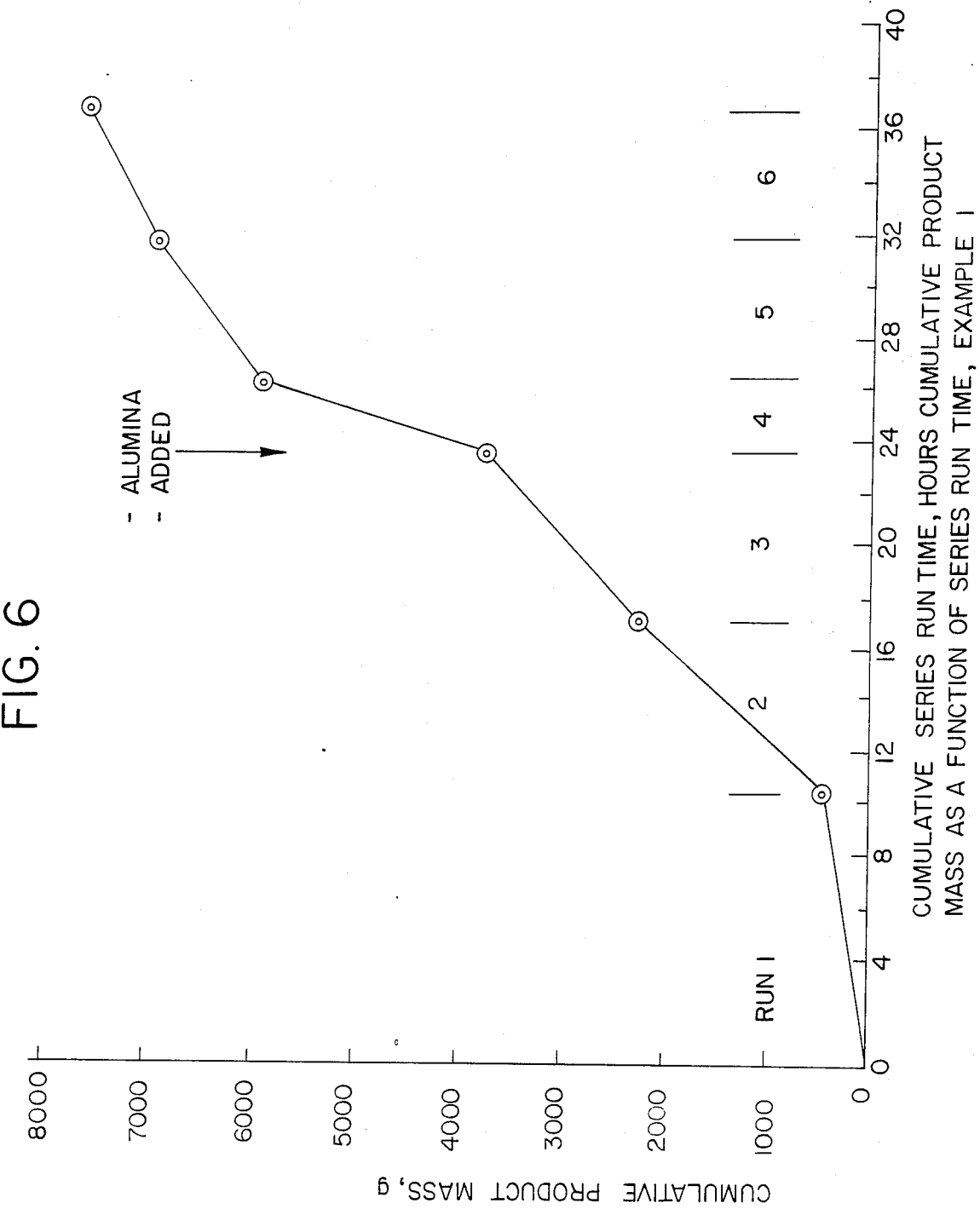

These and other features, aspects, and advantages of the present invention will become better understood with reference to the following description, appended claims, and accompanying drawings where:

FIG. 1 schematically shows a single stage process according to the present invention and includes an elevation view of a reactor used in the process;

FIG. 2 schematically shows a modification of the process of FIG. 1 for producing a high carbon content material;

FIG. 3 schematically shows a two stage process according to the present invention and includes an elevation view of a reactor suitable in the process;

FIG. 4 schematically shows a modification of the process of FIG. 1 for producing a relatively low bulk density product;

FIG. 5 schematically shows a modification of the process of FIG. 1, the reactor used having an expanded freeboard section and a lower bubbling bed layer of inert material to enhance reactor performance; and FIG. 6 shows graphically the results from using a process according to the present invention.

DESCRIPTION

The present invention a provides a fluidized bed process for preparing a predominantly fibrous carbonaceous/ferrous metal material (also referred to as carbon/metal product). This material comprises from 50 to 98% by weight carbon, from about 2 to about 50% by weight ferrous metal, and from about 0.1 to about 1.5% by weight hydrogen. By the term "ferrous metal" there is meant a metal of Group VIII of the Periodic Table of the Elements, such as iron, cobalt, nickel, and combinations, carbides, oxides, and alloys thereof. The fibrous carbonaceous/ferrous metal material includes a major phase and a minor phase, the major phase comprising from about 95 to about 99.9% by weight carbon, from about 0.1% to about 1.5% hydrogen, and the balance, if any, being the ferrous metal. The minor component is nodules which are dispersed throughout the major phase and are intimately associated with and at least partly bonded to the carbon in the major phase. The minor phase comprises carbon and at least 50% by weight ferrous metal.

In the process, a feed gas containing carbon monoxide is introduced into a reaction zone containing particulate material to form a fluidized bed. The particulate material comprises an abradant and a ferrous metal containing catalyst. The catalyst catalyzes the disproportionation of at least a portion of the carbon monoxide to form (i) a reacted gas stream and (ii) a predominantly fibrous carbonaceous/ferrous metal material that forms on the surface of the catalyst. The reacted gas elutriates the abraded material from the fluidized bed. The abradant promotes elutriation of the product, enhances heat transfer from the reactor, and helps provide temperature uniformity within the reactor.

In a first embodiment of this method, the particulate ferrous metal component catalyst and the abradant are separate, discrete particles. The catalyst particles preferably have a mass mean particle size of from about 50 to 300 microns. As the catalyst particle size increases, the density of the product increases and the carbon content of the product decreases.

In a second embodiment, the ferrous metal component catalyst is deposited on, and carried by the abradant particles. Deposition can be effected by vapor deposition or from a liquid solution. The mass mean particle size of the catalyst in the second embodiment is less than about one micron.

All particle sizes presented herein, whether described as "weight average particle size" or "mass mean particle size" are particle sizes as determined by micromerograph or sieve analysis.

Particulate abradant is used with both of these embodiments. The abradants are preferably inert, i.e. noncatalytic with respect to carbon deposition. Examples of the abradants useful in this new fluidized bed process are alumina, silica, silicon carbide, and Blastite. Blastite is a sand blasting material composed primarily of alumina with some iron oxides and other metal oxides. Such abradants have a density in the range of about 1 to about 4 grams per cubic centimeter Generally, the abradant constitutes about 10% to about 90% by weight of the solids in the fluidized bed. Preferably, the abradant constitutes about ⅜ to about 4/5 by weight of the solids in the fluidized bed. The mass mean particle size of the abradant is from about 50 to about 300 microns, preferably from about 80 to about 120 microns.

It has been determined that an angular abradant such as angular alumina having a weight average particle size of 120 microns and a bulk density of 1.65 g/cm is a satisfactory abradant. However, small particles of alumina, i.e. weight average particle size of 9 microns, are unsatisfactory. Similarly, low density particulate material such as spherical silica having a weight average particle size of 67 microns and a bulk density of 0.78 g/cm$^3$ is unsatisfactory.

The abradant helps abrade the carbonaceous/ferrous metal material that forms on the surface of the catalyst from the catalyst to produce the carbon/metal product. The abradant also promotes elutriation of the product from the bed, enhances heat transfer from the reactor, and helps provide temperature uniformity through the reactor.

In the first embodiment, where the ferrous metal catalyst is in the form of discrete particles with a mass mean size larger than 120 microns, then preferably two abradants are used. A second relatively larger abradant is used along with the relatively smaller abradant, the smaller abradant having a mass mean size in the range of from about 80 to about 120 microns. The larger size abradant has a mass mean size about equal to the mass mean size of the catalyst and a density at least equal to that of the smaller size abradant, and preferably has a density of about 1.5 times the density of the smaller abradant. The purpose of using a larger, more dense abradant and a smaller, less dense abradant is to maintain abradant well distributed throughout the entire bed. When ferrous metal catalyst particles larger than about 120 microns are used, the fluidized bed tends to consist of a lower, denser, ferrous metal rich region, and an upper, less dense, carbon rich region. The larger, denser abradant is present primarily in the lower ferrous metal rich region and the smaller, less dense abradant is present primarily in the upper carbon rich region. When two abradants are used, each abradant comprises at least 10% by weight of the abradant used in the reactor.

It can be desirable to have a bubble formation zone comprising a thin layer, typically 10 to 30 cm deep, of inert particulate material at the bottom of the reactor. The particulate material has a mass mean particle size of from about 200 to 300 microns and a bulk density in the range of 1.4 to 4 g/cm$^3$. The particulate material used for the bubbling formation zone can be the same material used for the abradant. Under the desired operating conditions, this bottom bubble layer produces gas bubbles in the range of about 5 to 15 centimeters in diameter. These bubbles break up upon reaching the carbonaceous upper region of the fluidized bed. The purpose of the bubbling layer is to provide agitation to the reactive portion of the fluidized bed to enhance solids circulation and heat transfer. The lower bubbling layer is most effectively used in conjunction with a flat gas distributor plate.

The new fluid bed process is generally carried out in a temperature range of about 300° C. to about 700° C., preferably in the range of about 400° C. to about 550° C. The reactor operating pressure is from about 1 to about 10 atmospheres.

Contact time of carbon monoxide with catalyst is generally in the range of about 1 to about 15 seconds, more preferably in the range of about 8 to about 12 seconds.

The superficial velocity of the gas introduced into the reaction zone needs to be sufficient to fluidize the bed and to elutriate from the bed the product carbonaceous/ferrous metal material. More specifically, the superficial velocity should be at least 1.5 times, and preferably at least 2 times, the minimum fluidization velocity of the abradant material or the ferrous metal material used, whichever has the greater minimum fluidization velocity. The superficial velocity under steady state conditions provides an entrainment rate of the carbon portion of the product which is equal to the deposition rate of the carbon in order to maintain a constant carbon inventory in the reactor, and to provide the desired ratio of carbon to ferrous metal in the elutriated product. In general, the ratio of carbon to ferrous metal in the product tends to decrease with increasing gas superficial velocity. In addition to the requirement to adequately fluidize the abradant and ferrous metal materials, it is also necessary to adequately fluidize the carbon rich material. The effective minimum fluidization velocity of the carbon rich material is in the range of about 10 to about 15 cm/s (centimeters per second). It is normally the case that a superficial velocity high enough to provide adequate product elutriation also provides adequate fluidization of the carbon rich material.

The superficial velocity of the reactants through the fluidized bed is generally in the range of about 10 cm/s to about 70 cm/s, more preferably from about 20 cm/s to about 60 cm/s. The lower part of the range, up to about 40 cm/s, is preferred for production of material with about 15% or less ferrous metal content, and the upper region, above about 40 cm/s, is preferred for production of material with about 15% or more ferrous metal content.

In one series of tests it was determined that increasing the superficial velocity of the feed gas through the reactor from about 32 centimeters per second to about 40 centimeters per second favored production of fibrous material, while the lower velocity favored production of a granular, denser form of carbon.

The system design and operating conditions are selected to provide a bed turnover time, which is the ratio of carbon mass in the bed to the rate of carbon deposition, of less than 50 hours, and preferably of less than 25 hours. Generally the bed turnover time is in the range of 2 to 50 hours, and preferably in the range of 4 to 25 hours. In general, the ratio of carbon to ferrous metal in the product increases as the turnover time increases. Product containing in excess of 40% carbon can be produced in only one hour or less from startup.

The fluidizing agent for this process is a gas mixture whose reactive components are carbon monoxide and hydrogen. When made conventionally, as in coal gasification, such gas mixtures generally also contain nonreactive components such as nitrogen. Most commercially available gas feed streams containing carbon monoxide also contain relatively large amounts of hydrogen. This process is generally used with feed gas streams having carbon monoxide to hydrogen molar ratios of at least 1:1, preferably at least 2:1, and generally up to 10:1. The carbon monoxide concentration at the reactor inlet is at least 15% by volume, and preferably in the range of 20%–60%.

Preferably the feed gas inlet temperature is at least 50° C. lower than the reactor temperature. Generally the feed gas inlet temperature is less than about 300° C., and preferably less than about 250° C., for three reasons: (i) to avoid deposition of carbon upstream of the reaction zone which can occur at high temperatures; (ii) to avoid local over-heating at the reaction zone entrance; and (iii) to help remove heat of reaction in the vicinity of the reaction zone entrance The disproportionation reaction is exothermic, and cooling can be required. If an inlet gas temperature above 250° C. is used, it is important to select materials that are not catalytic to carbon deposition at the gas inlet. Similarly, all exposed surfaces within the fluidized bed carbon deposition reactor system that are maintained at a temperature above 250° C. preferably are non-catalytic with respect to carbon deposition.

Exemplary of suitable catalysts are malleable iron shot, steel shot, atomized steel, and sponge iron. It has been found that sponge iron is active at disproportionating carbon monoxide at temperatures as low as 450° C., while steel shot and atomized steel require temperatures in the order of about 550° C. Preoxidization of these forms of iron is desired to enhance reactivity with carbon monoxide. Preoxidization of the iron can be done in a furnace at about 800° C. for a short amount of time, or by placing the iron in a pan, covering the iron with water, and baking it at 100 to 120° C. Addition of oxygen equal to about 1% of the mass of the iron is desired for these forms of iron which are supplied in an unoxidized state. Preoxidation of iron oxide powder and iron ore powder rich in iron oxides is not necessary, of course, since the iron is already primarily or entirely in an oxidized state.

Detailed disclosure of the disproportionation process and catalysts useful therefor appears in U.S. patent application Ser. No. 99,789 filed Dec. 3, 1979. In the preferred embodiment of that application, as here, the particulate catalyst is iron, iron oxide or iron ore. To obtain maximum carbon content in the product, the catalyst is preferably in a form having good structural integrity. Iron powders are examples of catalysts having good structural integrity, and iron oxide is an example of a catalyst having poor structural integrity The configuration of the reactor plays an important role in achieving desired product properties, and can vary according to the application and operating conditions. The reactor consists of a section containing a fluidized bed, a freeboard section above the fluidized bed, and a gas distribution entrance section. The section containing the fluidized bed also contains one or more heat transfer tube arrays to remove the heat of reaction from carbon deposition. The height of the fluidized bed section is from about 2 to about 20 meters, more preferably from about 4 to about 10 meters. The height of the freeboard section is from about 2 to about 10 meters, more preferably from about 4 to about 6 meters. The height to diameter ratio of the fluidized bed section is from about 1:1 to about 40:1, more preferably from about 4:1 to about 20:1

In its simplest form, the reactor can be a right circular cylinder. Depending on the application, it can be desirable to have a reactor where the fluid bed portion is divided into a lower, smaller diameter subsection and an upper, larger diameter subsection. This configuration can be particularly useful when a ferrous metal catalyst with mass mean particle size above about 120 microns is used, where the lower, smaller diameter portion is comprised mainly of ferrous metal catalyst and relatively larger, denser abradant, and the upper, larger diameter portion is comprised mainly of carbon rich carbonaceous/ferrous metal material and relatively smaller, less dense abradant.

In some cases, it can be desirable to have the freeboard section be of larger diameter than the fluid bed portion to maintain the elutriation rate at a reasonable level. This configuration can be particularly useful when the feed gas has a low concentration of carbon monoxide, which tends to promote an entrainment rate that can be significantly higher than the carbon deposition rate.

In yet other cases, it can be desirable to have carbon deposition in two successive reactors, where the material elutriated from the first reactor is fed to a second reactor and further carbon deposition takes place to increase the product carbon to metal ratio. This configuration can be particularly useful for producing material with a very high carbon to ferrous metal ratio, especially when a very low bulk density is required For example, if the carbon content of the product is lower than desired, i.e. from about 70% to 80% rather than 90%, its carbon content can be raised in a second stage. The elutriated product from the first stage can be reacted with additional carbon monoxide and hydrogen in a second fluidized bed that contains little or no free catalyst. In this second stage, the ferrous metal component catalyst bound in the product from the first stage catalyzes the disproportionation, resulting in a product of higher carbon content. If the second stage reaction does not proceed at a satisfactory rate, additional particulate catalyst can be added, either in supported or unsupported form, to produce a product having 90% carbon content or higher.

It is important that the product produced in the fluidized bed contain at least 2% ferrous metal. Such a material is useful for many applications in which a ferrous metal free material is not suitable. Table 1 presents the ferrous metal content, mass mean particle size, and bulk density of exemplary carbon/metal materials that can be produced by a process according to the present invention. Such carbon/metal materials can be used as a magnetic toner in xerography or as a catalyst for catalyzing ferrous group metal-catalyzed chemical reactions.

FIGS. 1-5 show reactor configurations and processes applicable to the present invention. FIG. 1 shows a configuration that can be used to produce a carbon/metal product with metal content from about 10% to about 50%. The fluidized bed reactor 1 includes a gas inlet 2 for the carbon monoxide containing gas, a gas distributor 3, and an overhead outlet 4 for exhaust of the product solids and the depleted gas. The lower portion of the reactor is occupied by a fluidized bed 5, which comprises ferrous metal, abradant, carbon, and hydrogen. Above the fluidized bed is a freeboard region 6. Product particles pass through the freeboard region 6 and exit the reactor 1, while abradant and ferrous metal particles which are carried into the freeboard region 6 preferentially fall back into the fluidized bed 5 due to their higher weight to drag ratio. Immersed in the fluidized bed 5 is a heat transfer tube array 7 with an inlet 8 and an outlet 9 for a heat transfer fluid. Steam is a preferred heat transfer fluid. A port 10 is provided for the introduction of ferrous metal material to compensate for that elutriated as product. Under steady state operating conditions, the top of the fluidized bed is at the same height as the top of the heat transfer tube array. The abradant in the fluid bed portion is well distributed to keep the carbon rich material from clinging to the heat transfer surfaces and inhibiting heat removal.

In operation, the process generally starts with a bed of ferrous metal and abradant particles. The carbon monoxide-containing gas enters through the inlet 2, passes through the gas distributor 3, fluidizes the bed portion 5, and provides carbon monoxide for disproportionation to carbon and carbon dioxide. The initial bed of abradant and ferrous metal occupy a small portion of the reactor and do not fully cover the heat transfer tube array. As carbon is deposited, the bed mass increases, the average bed density becomes lower due to the deposition of relatively low density carbon, and the bed volume increases. Under steady state conditions, the bed has grown to the point where the heat transfer array 7 is immersed, the elutriation rate of carbon is equal to the deposition rate, and makeup ferrous metal is fed to the reactor at a rate equal to the elutriation rate of ferrous metal in the product. The depleted gas and entrained product leave the reactor through the outlet 4 and pass through one or more cyclones 11 in which part of the product is separated from the gas stream and collected in a first storage container 12. The gas and remaining entrained solids then proceed to a bag house filter 13 where the remaining solids are removed from the gas stream and collected in a second storage container 14. The particle free depleted gas then proceeds through an exhaust line 15.

FIG. 2 shows a reactor configuration 101 particularly suited for production of a high carbon content version of product B of Table 1, the product having a ferrous metal content of from about 3% to about 15%. (A low carbon content version product B of Table 1 can be produced with the reactor configuration of FIG. 1). The two-level fluidized bed reactor 101 includes a gas inlet 104 for a carbon monoxide containing gas. The feed gas enters the lower and upper segments of the reactor through lower and upper gas distributors 105 and 106. A lower portion 102 of the fluidized bed contains predominantly larger abradant and ferrous metal rich carbon/metal material. Carbon rich material breaks off from the ferrous metal particles and is carried into the upper portion 103 of the fluidized bed, which contains predominantly smaller abradant and carbon rich carbon/metal material. The lower 102 and upper 103 portions of the fluidized bed contain heat transfer tube arrays 107 and 110, respectively, with inlets 108 and 111, respectively, and outlets 109 and 112, respectively. Makeup ferrous metal particles are fed to the lower portion 102 of the fluidized bed by means of a feed port 120. Above the upper fluidized bed section 103 is a freeboard section 113, through which the depleted gas and product material passes on the way to an outlet line 114.

In operation, the process starts with the lower portion 102 of the bed containin9 ferrous metal particles and abradant particles, each having a mass mean size in the range of about 120 to 300 microns. The carbon monoxide containing gas enters through the inlet line 104, passes through the lower gas distributor 105, and fluidizes the lower portion 102 of the bed. The upper portion 103 of the bed initially contains only smaller abradant with a mass mean size of from about 80 to about 120 microns. It is fluidized by the gas leaving the lower portion 102 and by secondary gas entering through the upper level gas distributor 106. The secondary gas helps maintain a substantially constant superficial velocity through the reactor. As carbon is deposited in the lower portion 102, carbon/ferrous metal particles break off and are carried into the upper portion 103 where additional carbon deposition occurs. The gas superficial velocity in the upper portion 103 is at least equal to the superficial velocity in the lower portion 102, and can be up to about 50% higher, to minimize backmixing of upper portion material into the lower portion. The lower heat transfer array 107 is fully immersed in the bed at all times. The upper heat transfer array 110 is partially immersed in the bed at the beginning of the operation prior to carbon deposition, and is fully immersed under steady state conditions. The upper portion 103 of the bed increases in volume as additional carbon is deposited until steady state equilibrium conditions are reached. Under steady state conditions, the upper heat transfer array 110 is just covered by the upper fluid bed portion 103, the entrainment rate of the carbon portion of the carbon/metal product is equal to the carbon deposition rate, and the entrainment rate of the metal portion of the carbon/metal product is equal to the makeup rate of ferrous metal fed through the makeup feed port 120.

Operating conditions and materials are selected to provide a product with an average ferrous metal content of between about 3% and 15%, as desired. The elutriated product and depleted feed gas pass through the freeboard section 113 and exit the reactor through the outlet line 114. Part of the solid product is separated from the gas stream in a cyclone 115 and collected in a container 116, while the remaining solids are separated in a bag house filter 117 and are collected in a second container 118. The particle free depleted gas stream then exits through an exhaust line 119. The reactor configuration shown in FIG. 2 is well suited for producing product B of Table 1, but can also be useful for production of products C and D of Table 1.

FIG. 3 shows a two stage process which is particularly useful for production of products C and D of Table 1. It can also be used for production of a low metal content version of Products A and B. A first stage reactor 201 is similar to and contains the same general components as the reactor 1 in FIG. 1, including a heat transfer array 205 with an inlet 206 and an outlet 207. The partially depleted gas and entrained solids from the first stage reactor 201 exit through a transfer line 209 and enter a second stage reactor 210 through an injection nozzle 212. The nozzle 212 assures good distribution in the second bed 211 in the second stage reactor 210 without clogging and prevents backflow into the transfer line 209. The second stage reactor 210 is also fed by fresh carbon monoxide containing gas through a feed line 202, the gas entering the bed through a distributor plate 213.

In operation, feed gas enters the first stage reactor 201 through the feed line 202 and a distributor plate 203. The fluidized bed 204 in the first stage reactor 201 initially contains abradant particles and ferrous metal. The metal can be in the form of separate particles, can be attached to the abradant, or can be mixed with previously produced carbon/ferrous metal product. The bed solids consist of carbon, abradant, and ferrous metal. Under steady state conditions, the fluidized bed 204 just covers the heat transfer array 205. The removal rate of the carbon component by elutriation is equal to the rate of carbon deposition and the rate of carbon fed as a catalyst carrier, if any. The removal rate of the ferrous metal component by elutriation is equal to the rate of metal makeup through a feed port 224. The carbon/ferrous metal material transferred by entrainment from the first stage reactor 201 to the second stage reactor 210 typically has a metal content in the range of about 6% to about 20%, depending on operating conditions and catalyst form.

In the second stage reactor, additional carbon is deposited to reduce the metal content to about 2% to 10%, depending on the desired final metal content. The second stage fluidized bed 211 comprises abradant and carbon/ferrous material. At steady state, the fluidized bed 211 just covers the heat transfer array 214 in the second stage reactor 210. The rate of entrainment of the carbon component through an outlet line 218 from the second stage is equal to the sum of the carbon feed rate through the transfer line 209 and the carbon deposition rate. The rate of entrainment of the ferrous metal component is equal to the feed rate of the ferrous metal component through the transfer line 209. Upon exiting the second stage reactor, the depleted gas stream and entrained product enter a cyclone 219 where some of the product solids are separated and collected in a first container 220. The gas and remaining entrained solids enter a bag house filter 221 where the remaining solids are removed and collected in a second container 222. The particle free depleted gas then exits through an exhaust line 223. For this configuration, the second stage reactor 210 preferably has a diameter between 1.2 and 3 times, and preferably between 1.4 and 2 times, the diameter of the first stage reactor 201.

FIG. 4 shows a variation on the configuration in FIG. 3. The configuration in FIG. 4 is particularly useful for production of Product A with ferrous metal contents from about 3% to about 10%. It is similar to the configuration in FIG. 3 except for the mode of solids transfer between the first stage reactor 201 and the second stage reactor 210. In this case, the depleted feed gas and entrained solids from the first stage reactor 201 pass through a cyclone 304 and a bag house filter 306 to separate the solids from the depleted gas stream, which exhausts through an exit line 308. The bag house material is periodically collected in a lock hopper 307. Solids from the lock hopper 307 and the cyclone 304 are discharged into a transfer line 305 and fed into the second stage reactor 210. Passing the solids through the cyclone 304 has the effect of fragmenting the particles and significantly decreasing the bulk density of the carbon/ferrous metal material prior to second stage carbon deposition.

In operation, the reactor system in FIG. 4 is very much like that in FIG. 3. Reactor internal details are similar. The first stage fluid bed reactor is fed by the gas inlet line 302. Makeup catalyst is added through the feed port 224. Depleted gas and first stage entrained solids exit the reactor through the exhaust line 303. The solids are separated from the depleted gas stream in the cyclone 304 and the bag house filter 306, and the particle free depleted gas exhausts through a gas line 308. The bag house 306 periodically discharges solids into the lock hopper 307. The lock hopper and cyclone feed solids pass through the transfer line 305 to the second stage reactor 210, preferably near the bottom of the bed. The second stage reactor 210 uses gas from the feed line 202. The depleted second stage gas and entrained solids pass out of the reactor 210 through line 218 and the cyclone 219, where a portion of the solid product is collected in the first container 220. The gas and remaining solids pass into the bag house filter 221 and the remaining solids are collected in the second container 222. The particle free depleted gas exits through line 223.

The mode of solids transfer between the first and second stage reactors shown in FIG. 4 is preferred to that shown in FIG. 3 when a low bulk density product, such as a product with a bulk density below 0.15 g/cm$^3$, is desired. It can also be preferred when a high carbon monoxide conversion efficiency, such as greater than 80%, is obtained in the first stage reactor, and the gas is of little further value for carbon deposition.

Rather than using a cyclone, if it is desired to transfer both gas and solids from a first stage reactor to a second stage reactor and further to reduce the bulk density of the solid particles between stages, this can be done by accelerating the particle laden gas stream between the stages, impacting it on a solid plate or series of plates. This has the effect of fragmenting the particles and decreasing their bulk density, re-entraining the solids, and completing the transfer.

FIG. 5 shows a fluid bed reactor 401 with a lower fluidized bed portion 404 and an upper expanded freeboard section 405 for entrainment control purposes. The reactor components and functions upstream and downstream of the freeboard section 405 are as described correspondingly in FIG. 1. The expanded freeboard section 405 lowers the entrainment rate from the rate that occurs when a nonexpanded freeboard section is used. The expanded freeboard section 405 is particularly useful when a high fluidization velocity is desired in the fluidized bed portion 404 of the reactor 401, and/or when the concentration of carbon monoxide in the feed gas is low. An expanded freeboard section can be used on either a first or second stage reactor, or both. The diameter of the expanded section 405 is preferably from about 1.2 to about 2 times the diameter of the bed section 404.

Any of the reactors shown in the Figures, including the fluid bed reactor 401 can include a bubbling bottom layer of inert particulate material to agitate the carbon deposition section of the fluidized bed 404. Gas entering from the feed line 402 through the gas distributor 403 fluidizes the lower 404A and upper 404B portions of the fluid bed. The lower portion 404A contains inert particles, preferably with a bulk density of from about 1.8 to about 4 g/cm$^3$ and a mass mean particle size of from about 200 to about 400 microns. The upper portion 404B contains a smaller abradant, preferably with a bulk density of from about 1.2 to about 1.8 g/cm$^3$ and a mass mean particle size of from about 80 to about 120 microns, ferrous metal catalyst, preferably with mass mean particle size below 100 microns, and deposited carbon. The two regions do not tend to mix. The gas superficial velocity in the reactor should be at least 1.5 times the minimum fluidization velocity for the lower layer inert material. When the bed is fluidized, gas bubbles are produced in the lower portion 404A, and rise up and dissipate into the upper portion. The bubbles have the effect of enhancing solids motion in the upper portion 404B, which in turn enhances heat transfer to the heat transfer array 110, minimizes the possibility of unfluidized sections occurring in the reaction zone, and enhances gas/solid contact, all of which have a positive effect on the process.

Operating and product data for the depicted reactor configurations is summarized in Tables 1-4. Table 1 identifies four product forms.

Table 2 presents the preferred process operating parameters for each product form: temperature, pressure, and gas superficial velocity. Products A and C are preferably made in a two stage process, while Products B and D can be made in either a one or two stage process.

Table 3 presents usable catalyst forms for each product, and the preferred size range. The catalysts fall into two broad categories: supported and unsupported. Supported catalysts are very fine, submicron forms which use abradant or carbon as a support. The unsupported catalysts are in a larger size powder form.

Table 4 presents abradant data. Abradant in the size range of 80-120 microns is always desired in second stage reactors and in the carbon rich regions of first stage reactors. Larger abradant, in the 120-300 micron range, is needed in addition to the 80-120 micron abradant in first stage operation when ferrous metal catalyst in the 120-300 micron size range is used. In either first or second stage operation, large inert particles in the 200-300 micron range can be used as a lower bubbling layer to provide bed agitation.

TABLE 1

Product Parameters

| Product | Ferrous Metal Content (% Weight) | Mean Particle Size* (Microns) | Bulk Density (g/cm$^3$) |
|---|---|---|---|
| A | 3-10 | 1-10 | .05-.25 |
| B | 3-60 | 5-50 | .10-.7 |
| C | 2-5 | 5-50 | .15-.3 |
| D | 3-10 | 5-50 | .1-.3 |

*as determined by micromerograph

TABLE 2

Process Parameters

| Product | Reactor Temperature (°C.) | Reactor Pressure (atm) | Superficial Velocity* (cm/s) | Number Of Stages |
|---|---|---|---|---|
| A | 400-470 | 1-10 | 15-40 | 2 |
| B | 450-550 | 1-10 | 20-70 | 1 or 2 |
| C | 400-550 | 1-10 | 30-60 | 2 |
| D | 400-550 | 1-10 | 30-60 | 1 or 2 |

*based on 1.2 atmosphere operating pressure and reactor temperature

TABLE 3

Catalyst Parameters

| Product | Catalyst Type | Mean Catalyst Size (Microns) |
|---|---|---|
| A | 1, 2, 3 | <1 |
|   | 4 | 10-100 |
| B | 4, 5, 6, 7 | 10-120 |
|   | 4, 5, 6, 7 | 120-300 |
| C | 1, 2, 3 | <1 |
|   | 4, 5, 6, 7 | 10-120 |
|   | 4, 5, 6, 7 | 120-300 |
| D | 1, 2, 3 | <1 |
|   | 4, 5, 6, 7 | 10-120 |
|   | 4, 5, 6, 7 | 120-300 |

CATALYST TYPES SUPPORTED
1. metal powder, e.g. submicron iron oxide
2. from liquid solution, e.g. ferrous nitrate
3. from gas phase, e.g. iron pentacarbonyl
UNSUPPORTED
4. sponge iron powder
5. atomized steel powder
6. iron shot
7. iron ore

TABLE 4

Preferred Abradant and Bubble Layer Particle Parameter

| Type of Use | Particle | Mean Particle Size (microns) |
|---|---|---|
| A | 1, 2, 3, 4 | 80-120 |
| B | 1, 2, 3, 4, | 120-300 |
| C | 1, 2, 3, 4, 5, 6 | 200-300 |

Type of Use
A. First stage, second stage reaction zones
B. First stage metal rich reaction zone when mean catalyst size exceeds 120 microns
C. Lower bubbling region to provide bed agitation
Type of Particle
1. Angular Alumina
2. Angular Silica
3. Angular Silica Carbide
4. Angular Blastite
5. Round Alumina
6. Round Silica

EXAMPLES

Example 1

Run 1

Advantages of the use of an abradant were evident from a series of runs conducted in a fluidized bed reactor which was cylindrical in shape, with an inside diameter of 10 centimeters and a height of 5 meters. Into this reactor there was placed a reactant mass of 2,500 grams of sponge iron powder having a size range of about 190 to about 260 microns. The iron particles had been partially oxidized to produce an initially oxidized total mass of 2,850 grams. After raising the reactor temperature to about 470° C., by means of external heaters, a gaseous mixture comprising 28% carbon monoxide, 15% hydrogen, and 57% nitrogen on a dry gas molar basis was passed through the reactor. During the first run only, the gas mixture also contained about 3% water vapor by volume. The volumetric gas flow through the fluidized bed was 1.07 standard liters per second (2.27 standard cubic feet per minute). The superficial velocity of the gas was 30 cm/s. The nominal bed temperature was 470° C.; the nominal pressure, 864 torr (16.7 psia).

During carburetion runs, solid carbon was deposited in the bed through disproportionation of the carbon monoxide in the feed gas. Solid material, in the form of carbon/ferrous metal component fragments, was removed from the bed by elutriation. The solid material was then removed from the gas stream by inertial means and by filtration. The collected solid material constituted the product of the carburetion reaction. During the first run, which lasted for about 10 hours, a total of about 1,842 grams of carbon was deposited in the bed. At the end of the run, the collected product had a mass of 417 grams and a carbon-to-iron ratio of 1.50/1.

Run 2

In a second run, the material left in the bed at the end of the first run was used. The second run was at the same temperature, pressure, volumetric flow and superficial velocity as run 1 except that water vapor was not used. The run lasted about 7 hours; a total of 1,305 grams of carbon deposited in the bed. To increase product collection rate, the nitrogen flow rate was periodically increased substantially for short time periods to increase the elutriation rate. As a result, the bed mass at the end of the run had decreased to about 3,712 grams (from 4,073 grams). The collected product mass weighted 1,657 grams, and the product had a carbon-to-iron ratio of 2:1.

Run 3

In a third run, the material left in the bed at the end of the second run was used. The same conditions as the second run were used, including the periodic nitrogen flow increases. The run time was about 6.5 hours, and the final bed mass was 3,710 grams, which was virtually identical to the final bed mass from run 2. A total of 1,407 grams of carbon were deposited in the bed, and 1,418 grams of product, with a carbon-to-iron ration of 2.23/1 were collected. During the run, the pressure drop across the gas distributor plate at the bottom of the bed increased rapidly, indicating clogging of the orifices in the plate.

Run 4

Before beginning a fourth run, 1,945 grams of alumina having a size range of about 260 to about 390 microns were added to the bed material left in the reactor after run 3. Run 4 was carried out at the same conditions as runs 2 and 3. Run 4 lasted for about 3 hours. A total of 620 grams of carbon deposited during this run. The rate of nitrogen flow was not increased at any time during this run. A total a 2,004 grams of product were collected. The product contained no alumina because all the alumina remained in the bed. The carbon and ferrous metal component dropped to 2,326 grams. The product had a carbon-to-iron ratio of 2.70:1. The pressure drop across the distributor plate was substantially higher at the beginning of run 4 than at the end of run 3. Apparently, because the alumina was added from about three meters above the plate, the effect was to drive the reactant mass into the plate orifices, worsening the clogging problem observed during run 3.

Run 5

Run 5 started with the bed material left after run 4 and was performed under the same conditions as runs 2-4. Again, the rate of nitrogen flow was not increased at any time during this run. The pressure drop across the distributor plate increased, but at a lower rate than in run 2. The run time was about 7 hours. A total of 1,040 grams of carbon was deposited. A total of 947 grams of product were collected. The ending reactant mass in the bed was 2,419 grams. The carbon-to-iron ratio of the product was 4.88:1, a large increase from earlier runs.

Run 6

Run 6, the last in the series, started with bed material left from run 5 and was performed under the same conditions as runs 2-5. Again, the rate of nitrogen flow was not increased at any time during this run. The pressure drop across the distributor plate fell below the pressure drop level present just after alumina was added. The final pressure drop was about half the maximum pressure drop attained during run 5. The run lasted about 5 hours. The mass of carbon deposited was 652 grams. The product mass was 1,163 grams, leaving a reactant mass in the bed of 1,908 grams. The carbon-to-iron ratio of the product material was 5.67:1.

As these data, set forth graphically in FIG. 6 show, the addition of alumina to the fluidized bed greatly increased the relative carbon content of the product, and reduced the reactant mass in the bed substantially without requiring periods of high flow. The data trend from runs 1 and 2 indicates that, if alumina had not been added to the reactor before run 3, the expected carbon-to-iron ratios for runs 4 and 5 product material would be about 2.33:1 and 2.57:1, respectively. Instead, those ratios were 4.88:1 and 5.67:1, respectively. Therefore, the observed carbon-toiron ratio in the products was about twice what was expected without alumina.

Example 2

In a second series of some 10 runs under the same conditions as the first series (Example 1), the change in product carbon-to-iron ratio was, for the first 6 runs of this second series, similar to that obtained in the first 6 runs of the first series. However, the product from the last run in this second series had a carbon-to-iron ratio greater than 15 to 1. Cumulative run time for this second series was about 70 hours.

Example 3

In a third series of runs, a mixture of the products from runs 3 to 6 (Example 1) in the first series was combined, with about 1,350 grams of alumina having a size range of about 260 to about 390 microns added. No previously uncarburized ferrous metal component was present during this third series. The ferrous metal component bound in the reactant carbon catalyzed disproportionation during this third series.

The disproportionation in this third series took place with a gas mixture including 50% carbon monoxide, 40% nitrogen and 10% hydrogen. The superficial gas velocity through the reactor was 20 centimeters per second. The operating conditions were otherwise the same as in the first series.

During this third series, elutriated products were recycled to the reactor for the first 20 hours of operation. At the end of 20 hours, the carbon-to-iron ratio in the product reached about 30:1. For the last 22 hours of operation, recycling was discontinued, but this high carbon-to-iron ratio in the elutriated product was maintained.

Example 4

A 290 hour carbon production run series took place over a three week period in a 16 cm diameter, 5 meter tall reactor. Operating conditions and results are presented in Table 5. The run began with a bed consisting of 1.5 kg of preoxidized atomized steel powder with a weight average particle size of about 250 microns and 2.5 kg of angular alumina abradant with a weight average particle size of about 350 microns. An additional 2.5 kg of alumina was added 72 hours into the run. The feed gas mixture was relatively lean in nitrogen during the first 80 hours to promote catalyst reactivity, and then gas flow conditions were held constant as shown in Table 5 for the remainder of the run. Makeup iron was added periodically to maintain an average iron inventory of about 3 to 4 kilograms in the bed. The rate of carbon deposition stayed generally constant after the first 30 hours of operation, and the product carryover rate stayed fairly constant after the first 100 hours of operation.

TABLE 5

Conditions and Results For Example 4 Run Series

| Time (hr) | Superficial Velocity (cm/s) | Iron In Bed (kg) | Carbon In Bed (kg) | Abradant In Bed (kg) | Carbon Deposition Rate (g/hr) | Product Rate (g/hr) | Product Properties | |
|---|---|---|---|---|---|---|---|---|
| | | | | | | | % Iron | Bulk Density (g/cm³) |
| Start | — | 1.5 | 0 | 2.5 | — | — | — | — |
| 40 | 20.7 | 1.2 | 8.5 | 2.5 | 410 | 140 | 10 | .28 |
| 80 | 32.2 | 3.2 | 20.6 | 5.0 | 470 | 310 | 5 | .37 |
| 120 | 32.2 | 2.5 | 21.1 | 5.0 | 430 | 430 | 6 | .36 |
| 160 | 32.2 | 3.7 | 22.2 | 5.0 | 340 | 380 | 10 | .24 |
| 200 | 32.2 | 3.8 | 23.8 | 5.0 | 430 | 390 | 11 | .24 |
| 240 | 32.2 | 4.1 | 28.1 | 5.0 | 440 | 380 | 11 | .30 |
| 280 | 32.2 | 2.8 | 32.6 | 5.0 | 420 | 420 | 9 | .36 |

Temperature: 550° C.
Iron: Atomized steel, 250 microns
Abradant: Angular alumina, 350 microns
Gas Composition: 27% CO, 12% $H_2$, 61% $N_2$ After 72 hours
Total Product:
128 kg
99 kg overhead
29 kg in bed, granular A continually increasing mass of carbon in the reactor, especially during the last 100 hours, shows that an equilibrium condition where carbon was elutriated from the reactor at a rate equal to the deposition rate was not achieved. At the end of the run when when the bed was emptied, the contents were found to be predominantly hard, spherical carbon/iron granular with an average size of about 180 microns, a bulk density of about 0.7 g/cm³, and an iron content of about 4%. This is in contrast to the relatively fibrous material elutriated from the reactor as shown in Table 5. Of the 128 kg of carbon/iron material produced during the series, about 23% was in the large, hard, dense granular form.

Example 5

Another production run series lasting 340 hours was conducted in an 11 centimeter diameter, 3.7 meter tall reactor. Operating conditions and results are presented in Table 6. In this run series, the problems associated with the series described in Example 4 were solved. The run began with a bed consisting of 1.2 kg of preoxidized iron shot with a weight average particle size of about 250 microns and 1.5 kg of angular alumina abradant with a weight average particle size of about 350 microns. An attempt was made early in the run to achieve a carbon deposition at 470° C. After about 75 hours, the temperature was raised to 540° C. and maintained there for the duration of the run series. The gas composition was maintained at 50% $N_2$, 30% CO, and 20% $H_2$ after about the first 33 hours of operation. The carbon deposition rate stayed generally constant at about 180 g/hr over the last 240 hours of the series.

TABLE 6

Conditions and Results For Example 5 Run Series

| Time (hr) | Superficial Velocity (cm/s) | Iron In Bed (kg) | Carbon In Bed (kg) | Abradant In Bed (kg) | Carbon Deposition Rate (g/hr) | Product Rate (g/hr) | Product Properties | |
|---|---|---|---|---|---|---|---|---|
| | | | | | | | % Iron | Bulk Density (g/cm³) |
| Start | — | 1.2 | 0 | 1.5 | — | — | — | — |
| 40 | 36 | 2.3 | 0.4 | 1.5 | 100 | 150 | 18 | .14 |
| 80 | 39 | 2.7 | 3.3 | 1.5 | 170 | 90 | 11 | .18 |
| 120 | 39 | 2.6 | 4.3 | 1.5 | 180 | 160 | 10 | .20 |
| 160 | 42 | 2.0 | 6.3 | 1.5 | 240 | 230 | 9 | .26 |
| 200 | 47 | 0.8 | 3.4 | 4.0 | 180 | 440 | 9 | .26 |
| 240 | 47 | 1.2 | 4.4 | 4.0 | 150 | 160 | 8 | .26 |
| 280 | 47 | 2.3 | 4.6 | 4.0 | 180 | 190 | 11 | .16 |
| 320 | 47 | 1.5 | 4.2 | 4.0 | 180 | 210 | 9 | .18 |

Temperature: 470° C. initial, 540° C. after 75 hours
Iron: Iron shot, 250 microns
Abradant: Angular alumina, 350 microns (initial) Angular silicon carbide, 120 microns (added after 182 hours)
Gas Composition: 30% CO, 20% $H_2$, 50% $N_2$ After 33 hours
Total Product:
56 kg
53 kg overhead
3 kg in bed, granular Makeup iron was added periodically to maintain an iron inventory in the bed of about 2 kg. The carbon inventory in the reactor increased steadily during the first 180 hours of operation. At hour 182, 2.5 kg of angular silicon carbide with a bulk density of about 1.4 g/cm³ and a weight average particle size of 120 microns was added to the reactor. In addition, the superficial gas velocity was increased to 47 cm/s, where it was held for the remaining 160 hours of the run. The combination of abradant and higher velocity quickly reduced the mass of carbon in the reactor, and allowed an equilibrium bed mass to be achieved, as the carbon inventory in the bed stayed essentially constant during the last 100 hours of the run. Also, the bulk density of the product was observed to decrease during the latter part of the run. When the bed was emptied following the run, only a small amount of granular carbon/iron material was found, and constituted only about 5% of the total material produced, as opposed to the 23% granular content noted in Example 4.

Example 6

Presented below are test conditions and results for a test run to produce a high metal content, high bulk density material. Testing was performed in the same 11 cm diameter reactor used for the testing in Example 5.

Operating Conditions

Temperature: 470° C.
Superficial Velocity: 63 cm/s
Run Time: 98 hours
Gas Composition: 33% CO, 6% $H_2$, 61% $N_2$
Catalyst: Sponge iron, 200 micron mean size, 3 kg initial mass
Abradant: Angular alumina, 350 micron mean size, 2 kg

Product

Total mass: 22 kg
Average Iron Content: 43%
Average Bulk Density: 0.5 g/cm$^3$

In this run, a combination of a friable catalyst form and a high gas velocity resulted in production of material that was elutriated from the reactor before it had an opportunity to achieve a high carbon content.

Example 7

Two runs were performed in a two stage mode to produce a high carbon content, low bulk density carbon/iron material. The runs were too short to establish steady state conditions such as those achieved in Example 5, but were of sufficient length to illustrate the concepts involved. Both runs were performed in the 16 cm diameter reactor used in Example 4.

First Stage Operating Conditions

Temperature: 470° C.
Run Time: 25 hours
Catalyst: Preoxidized sponge iron, 120 micron mean size, 5 kg mass
Abrandant:
  5 kg angular alumina, 260 micron mean size
  5 kg angular alumina, 120 micron mean size

| Time Into Run, Hours | Gas Composition, % CO | $H_2$ | $N_2$ | Superficial Velocity cm/s |
|---|---|---|---|---|
| 0–1 | 75 | 25 | 0 | 20 |
| 1–7 | 56 | 19 | 20 | 30 |
| 7–10 | 60 | 20 | 20 | 30 |
| 10–12 | 52 | 20 | 20 | 30 |
| 12–25 | 60 | 20 | 20 | 45 |

First Stage Product

Total Mass: 20 kg
Average Iron Content: 11%
Average Bulk Density: 0.20 g/cm$^3$

The changes in superficial velocity were used to minimize entrainment during the very early part of the run and to promote it during the second part. At the end of the run, the reactor contained 8 kg of relatively iron rich material in addition to the 10 kg of abradant. At the end of the run, the reactor was emptied in preparation for the second stage run.

Second Stage Operating Conditions

Temperature: 470° C.
Run Time: 34 hours
Superficial Velocity: 20 cm/s
Abradant: 3.4 kg angular Blastite, 300 micron mean size
  6.6 kg angular alumina, 120 micron mean size
Catalyst: 15 kg of material from first stage run, average iron content 9%, average bulk density 0.2 g/cm$^3$. Material fed in three 5 kg increments over first 23 hours of run.

| Gas Composition: | CO, % | $H_2$, % | $N_2$, % | |
|---|---|---|---|---|
| | 70 | 20 | 10 | (first 20 hours) |
| | 56 | 20 | 24 | (last 14 hours) |

Second Stage Product

Total mass: 27 kg
Average Iron Content: 5%
Average Bulk Density: 0.13 g/cm$^3$

The large Blastite abradant provided lower bubbling layer agitation, and the smaller alumina promoted elutriation. At the end of the run, only about 1 kg of carbon/iron material remained in the reactor.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A method for preparing a fibrous carbonaceous/ferrous group metal material comprising the steps of:
   (a) introducing a feed gas containing carbon monoxide into a reaction zone having a bed containing particulate material to form a fluidized bed, the particulate material comprising a discrete abradant and a discrete catalyst containing ferrous metal, the abradant constituting at least ⅔ of the weight of the particulate material, the catalyst catalyzing the disproportionation of at least a portion of the carbon monoxide to form (i) a reacted gas stream and (ii) a fibrous carbonaceous/ferrous metal material that forms on the surface of the catalyst, the abradant being non-catalytic to carbon deposition and abrading the fibrous carbonaceous/ferrous metal material from the surface of the catalyst, wherein the feed gas is introduced into the reaction zone (i) at a temperature at least 50° C. lower than the temperature of the reaction zone and (ii) at a sufficient velocity for fluidizing the particulate material and so that the reacted gas stream elutriates abraded fibrous carbonaceous/ferrous metal material from the fluidized bed at a rate such that the bed turnover time for carbon is from 2 to 50 hours;
   (b) maintaining the temperature in the reaction zone from 300° to 700° C.;
   (c) maintaining the pressure in the reaction zone from about 1 to about 10 atmospheres;
   (d) withdrawing elutriated fibrous carbonaceous/ferrous material from the reaction zone, the withdrawn material comprising at least 2% by weight ferrous metal and at least 70% weight carbon, the withdrawn material having a weight average particle size of from about 1 to about 50 microns; and (e) introducing catalyst to the reaction zone for replenishing the ferrous metal withdrawn from the reaction zone as part of the fibrous carbonaceous/ferrous metal material.

2. The method of claim 1 wherein the bed includes a lower ferrous metal-rich region and an upper carbon-rich region, the abradant in the lower region having a weight average particle size greater than about 120 microns and the abradant in the upper region having a weight average particle size of less than about 120 microns.

3. The method of claim 2 in which the abradant in the lower region is denser than the abradant in the upper region.

4. The method of claim 3 in which the density of the abradant in the lower region is at least 1.2 times the density of the abradant in the upper region.

5. The method of claim 2 in which the introduced catalyst comprises discrete particles having a weight average particle size of greater than 120 microns.

6. The method of claim 1 in which the withdrawn material contains more than 5% ferrous metal.

7. The method of claim 1 in which the fluidized bed is in a reactor having a lower portion with a first cross sectional area and an upper portion with a second cross sectional area that is greater than the first cross sectional area, the method including the step of introducing fluidization gas into the upper portion so that the superficial velocity of gas flowing through the upper portion is at least 80% of the superficial velocity of the gas flowing through the lower portion.

8. The method of claim 7 in which the fluidization gas is feed gas.

9. The method of claim 1 which includes contacting the abraded fibrous carbonaceous/ferrous metal material with carbon monoxide for increasing the carbon-to-ferrous metal ratio in the abraded material before it exits the bed, wherein the ferrous metal of the abraded material catalyzes the disproportionation of at least some of the carbon monoxide and wherein additional carbon forms on the abraded material.

10. The method of claim 1 wherein the abradant constitutes from about ⅔ to about 4/5 by weight of the total weight of the particulate material in the fluidized bed.

11. The method of claim 10 wherein the abradant has a weight average particle size of from about 80 to about 120 microns.

12. The method of claim 1 in which the temperature of the feed gas is 250° C. or lower.

13. The method of claim 1 in which the step of maintaining the temperature comprises cooling the reaction zone.

14. The method of claim 1 including the step of forming gas bubbles from the feed gas in a bubble formation zone for agitating the fluidized bed, the bubble formation zone comprising fluidized inert particles located proximate to the location that feed gas is introduced to the reaction zone, the inert particles being non-catalytic to carbon deposition and having a weight average particle size of at least 200 microns.

15. The method of claim 14 in which the inert particles in the bubble formation zone have a bulk density of from about 1.4 to about 4 $g/cm^3$ and a weight average particle size of from about 200 to about 300 microns.

16. The method of claim 1 in which the withdrawn material has a weight average particle size of greater than 5 microns.

17. The method of claim 1 in which the temperature in the reaction zone is maintained from 400° to 700° C.

18. The method of claim 1 in which the weight average particle size of the catalyst is less than 100 microns.

19. The method of claim 1 in which the abradant has a weight average particle size of from 80 to 120 microns.

20. The method of claim 1 in which the feed gas contains hydrogen and the volume ratio of carbon monoxide to hydrogen is at least 1:1.

21. The method of claim 20 in which the volume ratio of carbon monoxide to hydrogen in the feed gas is at least 2:1.

22. The method of claim 1 in which the bed turnover time for carbon is less than 25 hours.

23. The method of claim 1 in which the material withdrawn from the reaction zone has a bulk density of at least 0.05 $g/cm^3$.

24. The method of claim 23 in which the material withdrawn from the reaction zone has a bulk density of up to 0.7 $g/cm^3$.

25. The method of claim 1 wherein the superficial velocity of the feed gas through the reaction zone is about 40 to about 70 centimeters per second.

26. The method of claim 1 wherein the superficial velocity of the feed gas through the reaction zone is about 10 to about 70 centimeters per second.

27. A method for preparing a fibrous carbonaceous/ferrous group metal material comprising the steps of:

(a) introducing a feed gas containing carbon monoxide and hydrogen into a reaction zone having a bed containing particulate material to form a fluidized bed, the volume ratio of carbon monoxide to hydrogen in the feed gas being at least 2:1, the particulate material comprising a discrete abradant having a weight average particle size of from 80 to 120 microns and a discrete catalyst containing ferrous metal, the abradant being present in an amount of from about ⅔ to about 4/5 by weight of the particulate material, the catalyst catalyzing the disproportionation of at least a portion of the carbon monoxide to form (i) a reacted gas stream and (ii) a fibrous carbonaceous/ferrous metal material that forms on the surface of the catalyst, the abradant being non-catalytic to carbon deposition and abrading the fibrous carbonaceous/ferrous metal material from the surface of the catalyst, wherein the feed gas has a temperature of 250° C. or less and is introduced into the reaction zone at a sufficient velocity for fluidizing the particulate material and so that reacted gas stream elutriates abraded fibrous carbonaceous/ferrous metal material from the fluidized bed, the superifical velocity of gas in the rection zone being from about 10 to about 70 cm/s, the bed turnover time for carbon being from 4 to 50 hours;

(b) maintaining the temperature in the reaction zone from about 400° to about 550° by cooling the reaction zone;

(c) maintaining the pressure in the reaction zone from about 1 to about 10 atmospheres;

(d) withdraswing elutriated fibrous carbonaceous/ferrous metal material from the reaction zone, the withdrawn material comprising at least 2% by weight ferrous metal and at least 70% by weight carbon, the withdrawn material having a weight average particle size of from about 5 to about 50 microns and a bulk density of at least 0.5 g/cm³; and (e) introducing ferrous metal to the reaction zone for replenishing the ferrous metal withdrawn from the reaction zone as part of the fibrous carbonaceous/ferrous metal material.

28. The method of claim 27 in which the material withdrawn from the reaction zone has a bulk density of up to 0.7 g/cm³.

29. The method of claim 27 wherein the superficial velocity of the gas through the reaction zone is about 40 to about 70 centimeters per second.

30. A method for preparing a fibrous carboneous/ferrous group metal comprising the steps of:

(a) introducing a feed gas containing carbon monoxide into a reaction zone having a bed containing particulate material for forming a fluidized bed, the particulate material comprising a discrete abradant and a discrete catalyst containing ferrous metal, the abradant constituting at least ⅔ of the total weight of the particulate material in the fluidized bed, the catalyst catalyzing the disproportionation of at least a portion of the carbon monoxide to form (i) a reacted gas stream and (ii) a fibrous carbonaceous/ferrous metal material that forms on the surface of the catalyst, the abradant being non-catalytic to carbon deposition and abrading the fibrous carbonaceous/ferrous metal material from the surface of the catalyst, wherein the feed gas has a temperature of no more than 250° C. and is introduced into the reaction zone at a sufficient velocity for fluidizing the particulate material and so that the reacted gas elutriates abraded fibrous carbonaceous/ferrous metal material from the fluidized bed at a rate such that the bed turnover time for carbon is from 2 to 50 hours;

(b) maintaining the temperature in the reaction zone from about 400° to about 470° C.;

(c) maintaining the pressure in the reaction zone from about 1 to about 10 atmospheres;

(d) withdrawing elutriated fibrous carbonaceous/ferrous metal material from the reaction zone, the wtihdrawn material comprising from 3 to 10% by weight ferrous metal, having a weight average particle size of from 1 to about 10 microns, and a bulk density of at least 0.05 g/cm³; and (e) introducing ferrous metal catalyst to the reaction zone for replenishing the ferrous metal withdrawn from the reaction zone as part of the fibrous carbonaceous/ferrous metal material, the ferrous metal catalyst having a weight average particle size of from 0.1 to 100 microns.

31. The method of claim 30 in which the material withdrawn from the reaction zone has a bulk density of up to 0.25 g/cm³.

32. The method of claim 30 in which the material withdrawn from the reaction zone has a bulk density of up to 0.7 g/cm³.

33. The method of claim 32 in which the material withdrawn from the reaction zone has a bulk density of up to 0.25 g/cm³.

34. The method of claim 30 wherein the superficial velocity of the feed gas through the reaction zone is about 40 to about 70 centimeters per second.

* * * * *